June 22, 1965  J. C. LITTLE  3,190,065
DEAD ENDS FOR CABLES
Original Filed March 2, 1961  5 Sheets-Sheet 4
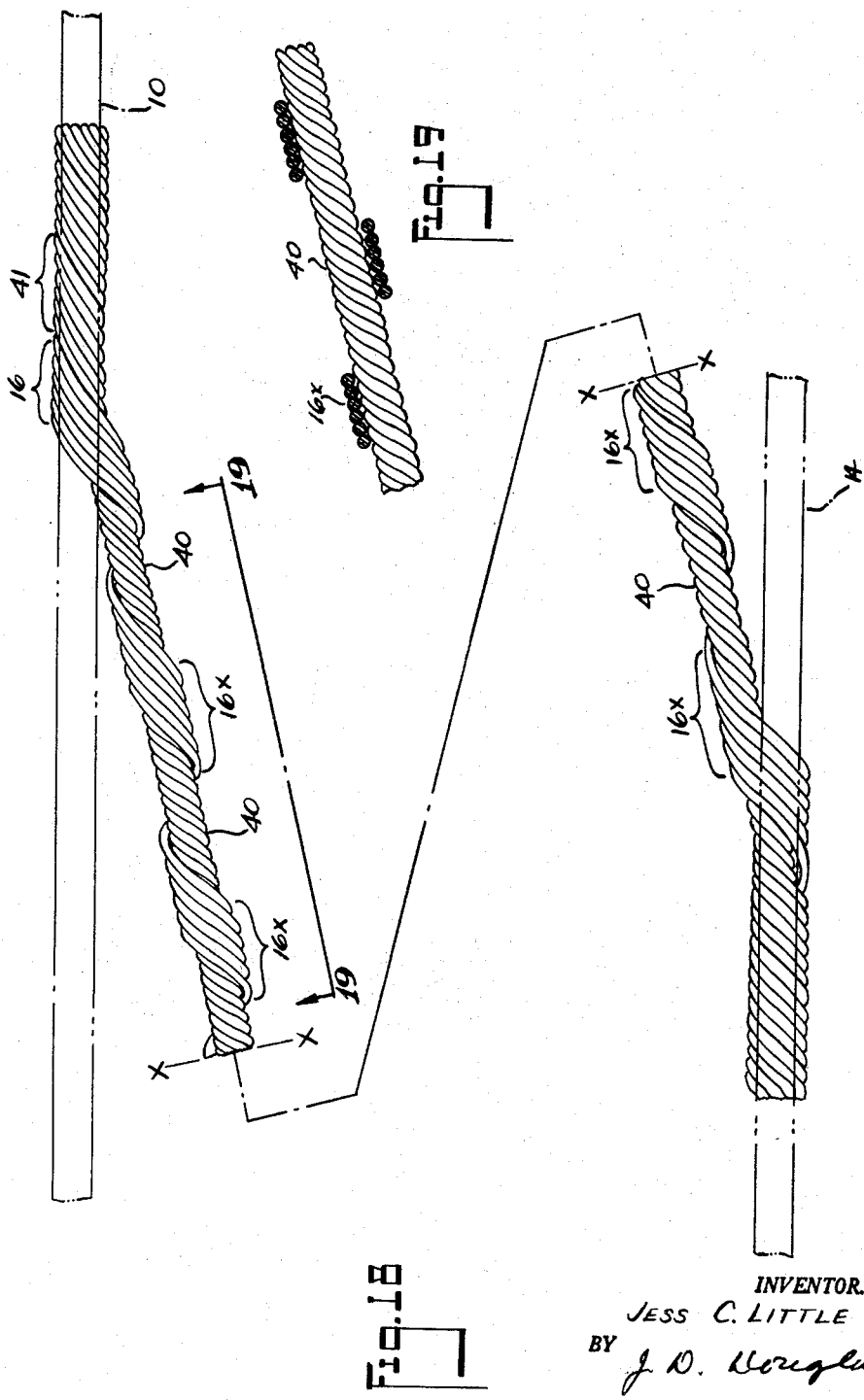
INVENTOR.
JESS C. LITTLE
BY J. D. Douglas
HIS ATTORNEY

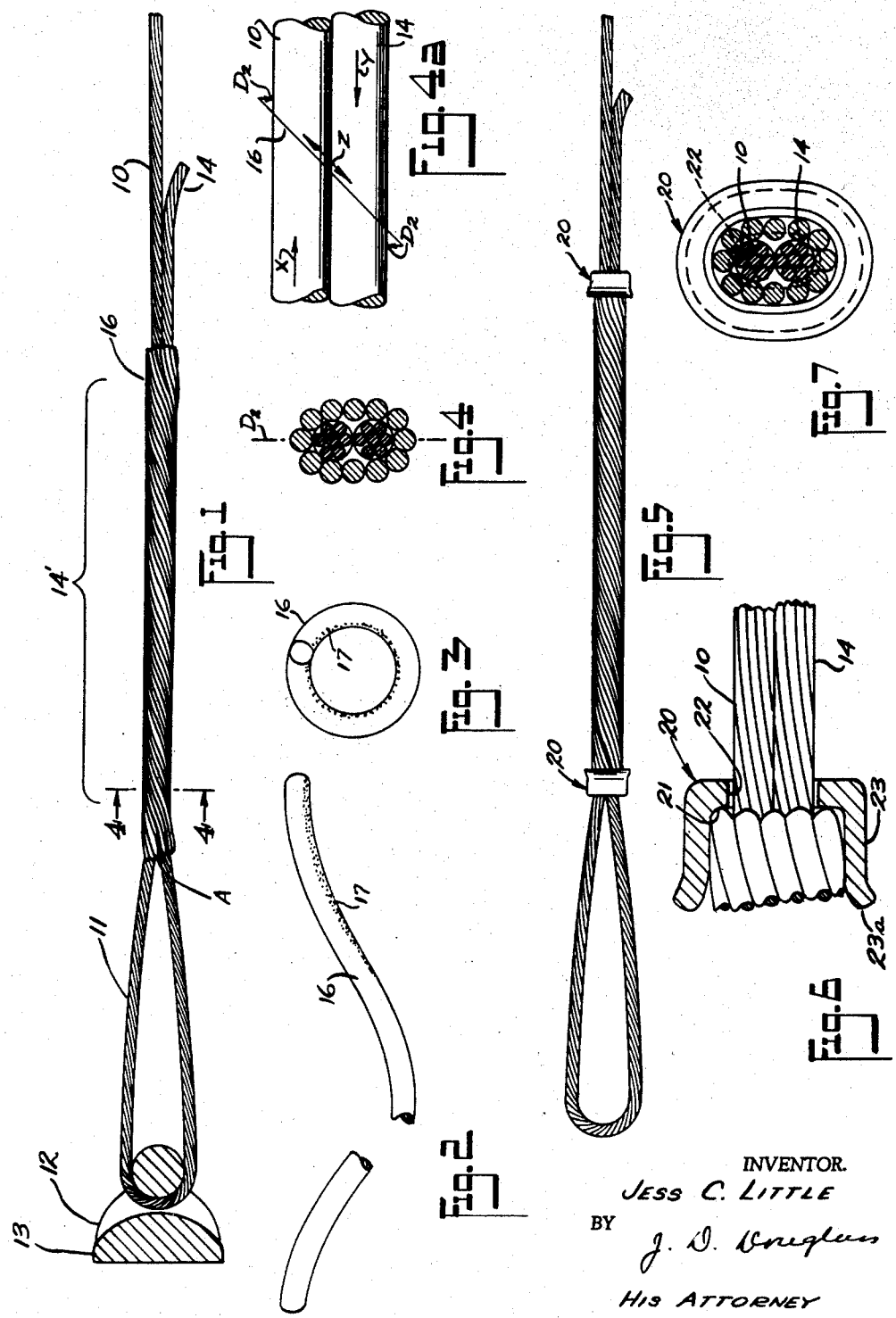

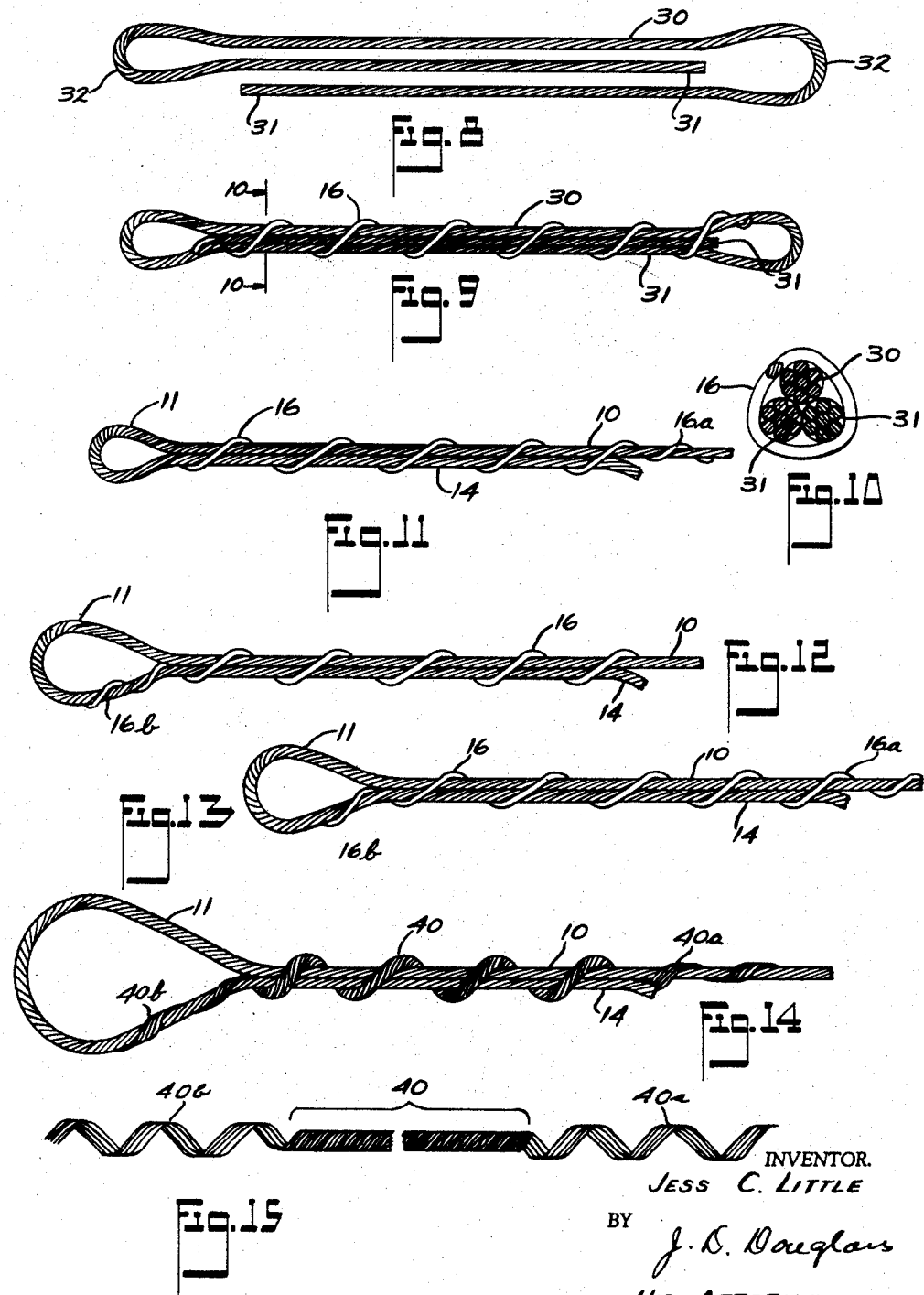

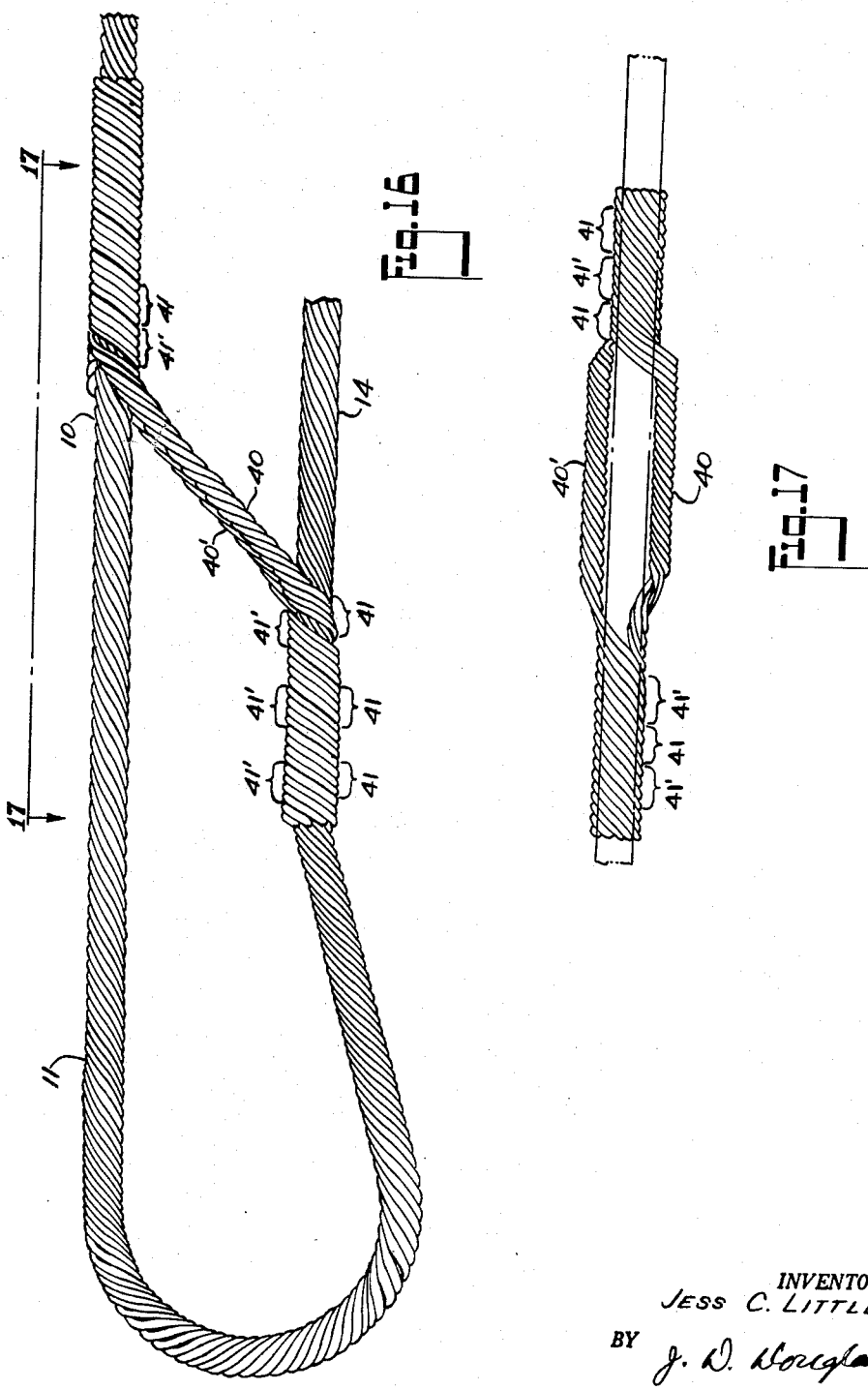

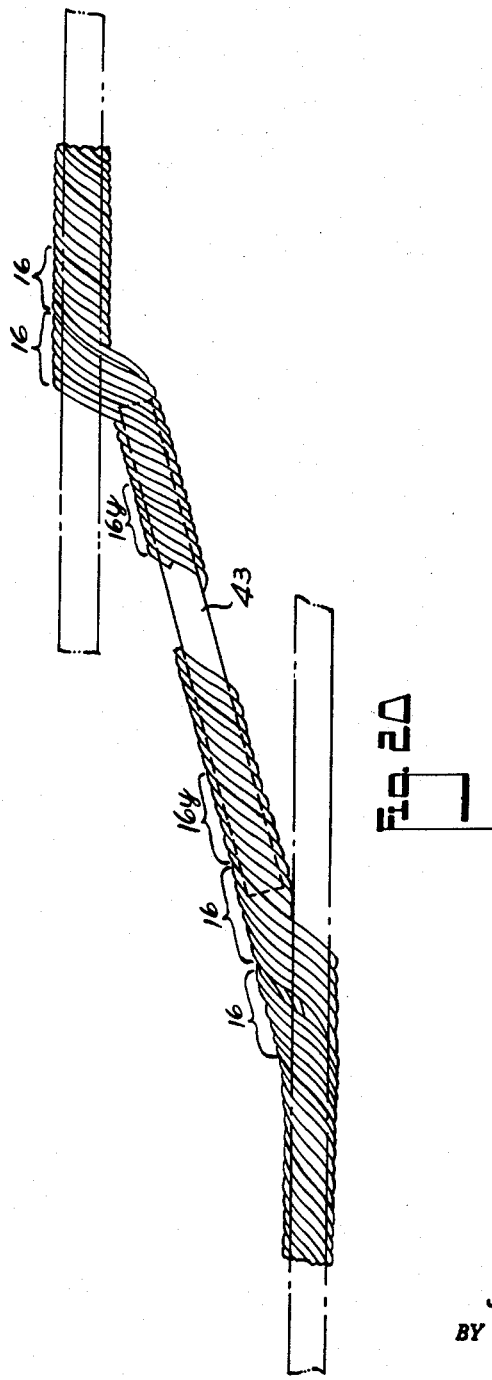

United States Patent Office 3,190,065
Patented June 22, 1965

3,190,065
DEAD ENDS FOR CABLES
Jess C. Little, Cleveland Heights, Ohio, assignor to The Fanner Manufacturing Company, a Division of Textron, Inc., Brookside Park, Cleveland, Ohio, a corporation of Rhode Island
Original application Mar. 2, 1961, Ser. No. 92,813, now Patent No. 3,132,468, dated May 12, 1964. Divided and this application Mar. 2, 1964, Ser. No. 357,850
7 Claims. (Cl. 57—145)

This application is a division of my copending application Serial No. 92,813, filed March 2, 1961, and now Patent No. 3,132,468, of May 12, 1964.

This invention relates to providing a loop or bight on the end of a line and more particularly to the formation of so-called "dead ends," although it is useful in other places such as in the making of connecting links and splices.

In the past, various ways of forming a fixed loop or bight on the end of a wire, strand, cable or the like have been proposed. In this specification frequent reference will be made to "line," "cable" and "strand." In the industry these could all be the same type of element, although usually a strand is a cable or line made up of several wires wrapped around a core in helical fashion where the wires have a pitch and the lay is the direction that the helical elements run around the core. One of the more simple ways, commonly known as "mousing," has been to merely bend the wire, cable or transmission line back upon itself to form a loop or bight and secure the free end in place alongside the main body of the line by wrapping a soft annealed wire around the free end and the main body of the line with the convolutions of the wrapping being adjacent each other and crossing the two parts of the line at an angle which is slightly less than 90°, depending on the thickness of the wire used. Such devices were not completely satisfactory because the soft wire had a tendency to creep and work loose. The construction had an inherent defect in that, since the convolutions were adjacent each other, undue strain on the loop caused the two portions so wrapped to slide relative to each other and the loop to become larger, or at least to cause its endmost part to move lengthwise and thus decrease the tension on the line. It was further difficult for installation, in that it was time-consuming, could not be readily done on "hot" wires (wires carrying voltages), and the character of the individual joints varied widely with the skill of the workman. The "mousing" came loose, particularly at the bight.

The "mousing" type of means for dead ending a wire was soon replaced by clamps, which usually consisted of two flat pieces of metal having longitudinally extending semi-circular grooves for receiving the two parts of the cable, which were clamped to the line by bolts. These were expensive to make and the bolts rusted and were difficult to remove when the fastening had to be replaced. They were also subject to being insufficiently tightened and with a resulting possibility of slipping.

More recently it has become the practice to provide a dead end which comprises a plurality of rods which are preformed to an open helix formation. A group of these rods are provided which are assembled together in a so-called "half lay," that is the proper number of rods are provided so that they will cover one-half of the line when they are wrapped around the line. These rods are then bent into a hairpin shape to form a loop or bight in the middle, and the two half lay legs are then wrapped around the end of the line and when so wrapped completely cover the line to form a whole lay. The individual helices are usually of an internal diameter slightly less than that of the line and have a pitch length usually less than the pitch and of the same lay as the line, so that they may be applied to the line from their side without permanent deformation.

Such dead ends, as described above have the advantage that they are quickly and easily applied and may be quickly and easily removed and re-used without the need of special tools.

A disadvantage of these dead ends was that in order to apply them tension had to be applied between the line and the means to which the dead end was applied, such as an anchor rod, after which the dead end was placed in position and then the tension was released and transferred to the dead end device. The difficulty was, that the exact amount of tension initially applied on the line was different than the required amount of tension for the final amount of tension on the line and the dead end after completion of the assembly. This was not only a matter of judgment of the workman but was often difficult or impossible to achieve, because of limitations of movement in the connected structures. Usually the tension after release was considerably less than the desired amount, and very rarely was it the same amount each time.

The present invention enables a dead end to be formed in the line itself and is formed with the loop of the dead end in situ and with the tension at exactly the correct amount. It also enables a dead end to be made quickly, uniformly and without the use of special tools. It has the advantage that it will not work loose in time. It requires no special fastening means that can rust. It is considerably more economical than the previous devices. It can be manufactured at high speed and cheaply. It can also be installed on the job quickly and easily.

The loop in the line itself is preferable to that in a preformed dead end in that it is much stronger, having a greater and tighter cross section of metal, making it less subject to rust and corrosion.

Another advantage of the new dead end resides in the fact that the bight may be made large or small without affecting the clamping means. That is, usually the bights were made substantially the same size for attachment to a strain insulator or to the eye of an anchor rod and were not usable if it was desired to pass the same around a pole or a dead man. In the present invention the loop or bight may be made any size desired. The length of the clamp rods is not used up in the bight as in some of the prior dead ends mentioned.

Still other advantages of the invention and the invention itself will become more apparent from the following description of some embodiments thereof and their method of application, which is illustrated in the accompanying drawings and forms a part of this specification.

In the drawings:
FIG. 1 is an elevational view of the end of a line dead-ended according to my invention;
FIG. 2 is an enlarged fragmentary side elevational view of one of the clamp rods;
FIG. 3 is a view of the rod of FIG. 2, looking into the end;
FIG. 4 is a section taken from the line 4—4 of FIG. 1;
FIG. 4a is a diagram illustrating the operation of the invention;
FIG. 5 is an elevational view of another embodiment of the invention;
FIG. 6 is an enlarged fragmentary elevation of a portion of a clamp means and an auxiliary holding ferrule shown in section;
FIG. 7 is an end elevational view of a ferrule prior to installation, with the clamp rods and lines shown in cross section;
FIG. 8 is an elevational view of a link in the process of assembly;

FIG. 9 is an elevational view of an assembled link;

FIG. 10 is a section taken on the line 10—10 of FIG. 9;

FIGS. 11 to 14 inclusive, are elevational views of other modifications of the invention;

FIG. 15 is an elevational view of the clamp means of FIG. 14 prior to installation;

FIG. 16 is a side elevational view of another embodiment of the invention;

FIG. 17 is a fragmentary view, with certain parts broken away, taken from the line 17—17 of FIG. 16;

FIG. 18 is a fragmentary elevation of another embodiment of the invention;

FIG. 19 is a view taken from the line 19—19 of FIG. 18 with certain parts shown in section; and FIG. 20 is a fragmentary elevational view of another embodiment of the invention.

Referring now to the drawings, throughout which like parts have been designated by like reference characters, and particularly to FIG. 1, there is illustrated the end of a line 10, which may be of stranded type. It will be appreciated that any kind of line may be dead ended according to the invention and the specific showing is merely for the purpose of clarity and is not intended to limit the invention to the specific character of the line dead ended. The end of the line is formed with a bight 11 which may be passed through the eye 12 of an anchor rod, insulator or bolt 13. As previously stated, it may be a large loop and be passed around a pole or dead man. The free end 14 of the line is then laid alongside the main body 10. Such a line is installed by the use of conventional jacks and "come along" wire grips which are attached to the main body of the line and the end 14. Tension is then applied to tighten the line 10 by pulling on the line 14, the desired amount.

Ordinarily the line would then be clamped by one or more clamps engaging the line in a zone indicated by the bracket 14 or by ordinary mousing with soft annealed wire. The present invention contemplates that the two juxtaposed parts of the line be clamped together by placing over the two parts one or more preformed helical clamp rods 16. The clamp rods are made of resilient material, preferably, but not limited thereto, of round cross section, in the form of an open helix, the inner diameter of which is greater than the maximum diameter of one line alone and less than the maximum diameter of the two juxtaposed parts. The pitch of the rods should preferably be less than that of the line when the line is a multi element line as previously noted, and of the same direction and lay, although the direction of lay may be opposite. It is also apparent that the diameter of the helical clamp rods could be less than the diameter of the line alone.

These rods are preformed into the desired conformation at the factory and are received by the user in their preformed state. As so formed, being an open helix, they may be assembled onto the two juxtaposed line parts by applying them to the parts from their sides and then by distorting the rods, but preferably not beyond their elastic limits, so that they wrap around the line parts. They may be applied singly, that is one at a time, or in groups of two, three or more.

It is preferred, but not critically necessary, that the inner surface of the rods, that is the inner surface of the helix, be coated with a suitable sharp abrasive, indicated at 17, held in place by a binder. The invention is not, however, limited to any particular type of coating material and other types which will increase the holding power and resist slippage will be apparent to those versed in the art.

A single rod, in its preformed state, is illustrated in FIG. 2 and an end view thereof is illustrated in FIG. 3. It will be noted that the rod is substantially and preferably a true open helix, the inner circumference of which falls in the plane of a cylinder. It will be appreciated that some latitude from a true cylindrical inner surface is allowable and that in some instances it may take other forms, such as square, triangular or elliptical, but that a cylinder is preferred because it is easier to make, greater uniformity is attained, and less problems are involved in its installation.

Although the number of rods used may be varied, it is preferred that a sufficient number be used so that where the rods engage with the line parts tangent to the outermost surfaces of the line indicated by the center line D2 through the greatest diameter, the sides of the rods are in abutting relation to each other, giving, in effect, an appearance of a whole lay at these points. Opposite the sides, or along lines parallel to the long axis of the two cable parts, they may be slightly spaced. The resultant distortion is to that of a modified ellipse, as shown in FIG. 4.

The result is that the inner surfaces of the rods engage with the outer surfaces of the line parts at the points of greater diameter of the juxtaposed parts. Although at some places this is a tangential engagement, at other places the lay of the rods will be so close to the lay of the line that the rods will enter into the slight valleys formed by the two adjacent wires of the strand. This will also help increase the holding effect.

Normally the distortion of the rods, as illustrated in FIG. 4, is well within the elastic limits of the rods, which would always return to their original shape of FIG. 3, if they were removed, although it is apparent that in some instances the rods may be distorted slightly beyond their original shape and take a permanent set that is slightly larger and may even no longer be a cylindrical helix. Thereafter the rods continuously engage with and exert pressure on the two line parts at points opposite their long diameter D2, FIG. 4.

There are several forces present which keep the two line parts from sliding alongside each other in opposite directions. One of these is the pressure of the rods against the line parts to cause the two parts, where they abut each other, to be pressed into close frictional engagement. In this respect it will be noted that since the pitch and the lay of the main line and the part alongside it are the same, at their points of juxtaposition they are actually in opposite directions, thus there is an apparent roughness between these two parts. This can be augmented by application of a vehicle carrying an abrasive to the juxtaposed parts, and, for that matter, all around these parts, at the time of installation, if desired. I have found, however, that the holding power of a joint made as contemplated is far in excess of the strength of the line, without the additional expedient.

The majority of the holding power in this instance is believed to be due to the engagement of the rods with the line or wire parts at point opposite the diameter D2, which has the effect of being anchored at these points and the tension, due to the points attempting to move in opposite directions, is in the clamp rods which frictionally connect these two points. This is best illustrated in FIGS. 4 and 4a, in which it will be noted that where the armor rods pass over the line parts, they have tangential engagement with one or more of the outer wires of the strands, at the top and bottom as viewed in FIG. 1. As stated, some of the rods actually go down into the valleys between a pair of the strands. The closer the pitch of the armor rods to that of the line, the greater will be the valley engagement. The pitch may, however, be considerably less than that of the line. It is preferred, however, that the pitch be between 20 and 45 degrees to a center line running parallel to the line. Thus, as shown in the diagram of FIG. 4a, any tendency of the two parts of the line to slide relative to each other, as indicated by the arrows X and Y, is resisted by the clamp rods and the tension is taken by the clamp rods, which grip the line more firmly and the tension is in the rods along the sides which are parallel to the two sides of the juxtaposed line parts.

Thus in FIG. 4a a single rod, indicated diagrammatically at 16, may be considered as anchored to the line at the points D2. Any tendency to move causes tension in the rods, as indicated by the arrow Z, which are alongside the two parts of the line.

In the old type of "mousing," a relative fine, single, soft wire was used and it was wrapped around the strands with the adjacent convolutions in contact with each other. In this type of device the only holding power was due to the tightness of the strands which pushed the two line parts together. There was very little strain placed on the sides of the wire because if the wires did move relative to each other the convolutions would merely tilt from their initial position of substantially 90° to the center line of the line. In time, the wire would loosen and then the individual convolutions could tilt and the maximum resistance to movement did not occur until the tilt was so great that the joint was already loose.

In most instances, it is desirable to have a pitch angle of at least 45° at the time of installation, although in certain instances sufficient holding power is obtained even if the angle is greater than 45°.

Another, and possible minor, advantage of the invention due to the operation of the device, can best be understood by viewing FIG. 1, and particularly where the bight of the line is provided with some type of grommet or where the opposite sides of the bight fan out widely. In this instance, as tension is increased and decreased, as it does when the line vibrates or which happens with the more slow changes in temperature, the tendency is for the parts of the bight at the point A where they start to fan out to increase the angle between them. In ordinary serving, this causes the soft wire to stretch and as the stress on the line comes and goes, the other convolutions gradually become loose until eventually the joint fails, unless it is rewrapped. In the clamp type of joint the bending occurs at the clamp and results in a fatigue and breakage at that point.

In the present invention, however, the ends of the clamp rods may move apart from each other, along with the parts of the bight, and although this spreading does not extend very far into the line enclosing clamp rods, they cushion the bending of the bight and cause the bending to be distributed over a larger area and with a resultant increase in life of the bight. Each time they spread apart or increase in tension they immediately come back together, due to the high resiliency of the clamp rods, upon decrease in tension.

Although in its simplest form, it is contemplated that the rods be applied to the line parts, as shown in FIG. 1. I also contemplate that a ferrule may be used, which can be slid over the ends of the rods, and which affords additional means for assuring that the rods will remain in position.

FIG. 5 illustrates a joint where the ferrules 20 have been applied over the line and to the ends of the rods. As best shown in FIGS. 6 and 7, a ferrule comprises an end wall 21 having an elongated opening 22 of a size and shape to freely receive the two parts 10 and 14 of the line, or the two parts of the bight 11 where they come into juxtaposition.

Extending from the end wall 21 is a skirt 23 which provides an outwardly spaced inner wall for receiving the ends of the clamp rods 16. If desired, the skirt may be flared outwardly at 23a to allow for easy insertion of the ends of the rods. Likewise the inner contour of the skirt is that of a modified ellipse. In utilizing this additional expedient the ferrules serve an additional service. Upon the making of a dead end, the two ferrules are placed on the line with their open ends facing each other. The line is then formed into the loop and the tail end passed through the ferrule; then this ferrule, which will be next to the bight, is moved toward the bight where it holds the two line parts close together. The second ferrule is then slid over the tail end of the line and thus holds the free end adjacent the main line body. Thus the parts are held in position prior to final assembly. The preformed clamp rods are then applied and, after being positioned, the ferrules are moved over the ends of the rods where they hold them within the confines of the skirt. Any tendency of the line to spread at the bight end merely pushes the ferrule down closer over the ends of the rods. It should be noted that the inner wall of the skirt may be flared outward slightly toward the base 21, if desired. In addition, the ends of the rods 16 may be bent outward slightly to make sure that the ends seat in the ferrule securely. Normally, however, no problem exists since the ferrules stay in place indefinitely and provide an additional means, which is easily installed, for holding the parts of the bight and the ends of the rods against spreading.

The diameter of the clamp rods may be varied depending upon the holding power desired. It is apparent, however, the fewer the number of rods used the heavier the rods will be. If a complete coverage of the joint is desired, it can be done with smaller diameter rods. It should be noted that if a single heavy clamp rod was used it could actually be so heavy as to cause a distortion of the cable under its tensioned condition. I have found that it is desirable to vary the size of the clamp wires with the diameter of the line. I have also found that if the clamp rods are assembled in groups of three rods in a unit that they provide for easy installation, although more or less rods may be used in the groups. When assembled in groups, which is done at the factory, the same vehicle which holds the abrasive on the rods, will hold them grouped together.

My invention is also useful, in the form illustrated, to make tension links of the general type shown in my Patent No. 2,918,783, of December 29, 1959.

In FIG. 8 I have illustrated a link in its preliminary stage of formation. A section 30 of line is provided, being approximately three times the length of the ultimate link. The ends 31 are bent back alongside the main body of the line, leaving the bight portions 32 at opposite ends. The portions which overlap each other are then brought into juxtaposed symmetrical relation to each other, as shown in FIG. 10. This provides a cross section that is generally triangular in form. The clamp rods or rods 16 are then placed in position around the overlapping portion of the link to form the complete link as shown in FIG. 9. It will be appreciated that the overlapping parts may be completely covered with clamp rods to form a whole lay and that the engagement of the clamp rods is tangential to the outermost parts of the link, as previously described. In this instance, the distortion is as shown in FIG. 10, wherein the circular configuration of the clamp rod has been distorted elastically toward a generally triangular shape. Where very long links are desired, it is not necessary that a clamp rod as long as the body of the link be provided because two separate sets of clamp rods could be used adjacent each of the bights. Furthermore, if desired, and the links are long, separate sets of clamp rods could be applied at spaced intervals along the body.

In FIG. 11 I have illustrated another embodiment of my invention. The clamp rod or rods are wrapped around the juxtaposed parts 10 and 14 as in the previous embodiment of FIG. 1. In this instance all or a portion of the rods are longer than the parts 14 and the tail end 16a is then wrapped around the main body of the line which extends beyond the portion 14. This provides additional holding power for the ends of the rods and eliminates the use of the ferrule 20 of FIGS. 6 and 7 at that end. A ferrule 20 may be used, in this embodiment, at the bight, if desired.

FIG. 12 illustrates another embodiment wherein the tail 16b is wrapped around a part of the bight portion.

This eliminates the use of a ferrule 20 at the bight end, although one may be used at the other end if desired.

FIG. 13 illustrates a dead end where the clamp rods are not only wrapped around the juxtaposed parts, but extend beyond those parts and the tail end wrapped around the main line, as in FIG. 11, and the other end 16b wrapped around a part of the bight, as in FIG. 12. In this instance, no ferrule 20 would be used.

FIGS. 14 and 15 illustrate another embodiment of my inveniton wherein the clamp rods are first formed into their helical formation and then they are assembled in groups of three or more after which a zone 40 intermediate their end portion is twisted to form a cable-like intermediate portion. The end portions 40a–40b are still in the open helix formation.

The device may be used as shown, with the intermediate part, which is now straight or this portion may additionally be formed into an open helix.

In the first instance, the straight twisted intermediate part 40 is formed around the parts 10 and 14. Then the untwisted ends of helical formation 40a and 40b are wrapped around the main body of the cable 10 and around a part of the bight 11 in much the same mnaner as that of FIG. 13.

Where the twisted part is formed in a helix the inner diameter of the helix should be smaller than the diameter of the two line parts. In this instance, the twisted body would normally be applied first and followed by applying the ends to the bight and line as previously described.

The elements assembled and twisted in their midportion as described, are useful in forming another embodiment of the invention shown in FIG. 16. In this embodiment, the twisted part 40 is not necessarily as long as that contemplated for the dead end of FIG. 14 and preferably is much shorter.

As illustrated in FIG. 16, the dead end is formed by making a bight 11 about the pole, anchor rod or other element as previously described. It is also apparent that the line could be wrapped around the pole for more than one wrap if desired. The desired amount of tension is obtained with the use of clamps on the line 10 and tail 14 and the usual come-along being connected between the clamps. An element formed as shown in FIG. 14 has the open helical end secured about the main line 10 to provide a first half lay about the line indicated by the brackets 41. The twisted portion 40 is then carried over to the bight and applied to the bight to form a half lay 41 about the bight. Then a second element, formed identical to the first element, has the open helical end 41' installed around the line between the rods 41 to form a whole lay. The twisted part 40' is then carried over in parallel relation to the first twisted part 40 and the open helical end wrapped in a similar manner about the bight to form a whole lay.

It will thus be seen that the assembly is a balanced assembly, the tension being from the main line to the tail of the bight and applied to opposite sides in an equal manner. The parts 40 and 41' being hard twisted do not stretch materially and each bears half the load. The open helical ends, providing a whole lay where they grip and hold the line and bight, provide an extremely good gripping power which does not slip.

FIGS. 18 and 19 show a similar type where an element such as illustrated in FIG. 14 is used in conjunction with a helix which is open throughout its length. In this instance, the element 41–40 is applied to the line the same as described to provide a half lay 41 on the line and the bight and the twisted connecting portion 40 cross over between the line 10 and tail 14. Then the open helix 16 is applied first between the half lays 41 to provide a whole lay, then it is applied over the twisted part 40, as indicated at 16X, and finally placed in position between the half lay portions 41 on the bight where they jointly form a whole lay.

This also results in a very strong connection forming the bight because there is a full lay on the bight and line and a hard twist with a half lay over it at the cross over section.

Still another embodiment of the invention is illustrated in FIG. 20. In this instance, the clamp rods 16 are all of open helical formation and substantially constant pitch throughout their length. The rods 16 are wrapped about the line singly or in groups to provide a whole lay. They are then directed toward the bight and at the zone 16Y where they cross over, a filler 43, is provided which may be a solid piece of metal, a small length of line or other material and the rods placed in position around this piece to form a whole lay crossing over from the line to the tail end or bight. Here again they are all wrapped around the bight to provide a whole lay 16 on the bight.

This has the advantage, as do the others, of FIGS. 16 and 17 that the cross over section is very strong and does not have the inherent resiliency of a single open helix, thus preventing stretching at this point. As in the others, it has the additional advantage that whole lays grip the bight and line. A further advantage lies in the fact that the simple form of open helix is used, which is cheaper to manufacture.

It has been found, from actual tests, that the holding power of the clamp rods applied as stated is such that it is impossible for the parts 10 and 14 to slip relative to each other sufficiently to be noticeable. In such tests the line itself has always broken and the dead end remained intact.

They are as stated previously, quicker, easier and more economical to manufacture; quicker and easier to install, and, may be installed without loss of tension on the line. They may also be quickly and easily removed and reused, which is particularly desirable on new lines which, after having been installed, sometimes need retensioning after a period of weathering.

It will also be apparent that the balanced relation of the clamp rods of FIG. 16 may also be obtained with clamp rods which do not have the twisted portion 40. In this instance, the clamp rods are of uniform pitch and diameter and are open helices throughout their length. Where they are applied to the line and bight, they form whole lays and the half lay parts are brought down at the cross over zone either as half lays or they may be placed together to form a hollow whole lay. This may be desirable in some instances where a certain amount of resiliency is desired between the whole lay portions that are on the line and bight.

As stated at the outset, the invention is also useful in making splices. In this instance, the two lines are brought alongside each other in overlapping relation and then the clamp rods 16 applied as shown in either of FIGS. 1, or 11 to 14 inclusive. The ferrule 20 could also be used if desired.

Having thus described the invention in some embodiments thereof, it is appreciated that numerous and extensive departures will be apparent to those versed in the art without departing from the spirit or scope of the invention as defined in the appended claims.

I claim:

1. In combination with a main line arranged to be formed into a bight or loop and passed around or through a device to which it is to be anchored and having a tail end brought back opposite to the main line, means to secure the tail end of the line against longitudinal movement in a direction opposite to that of the main line comprising a pair of securing elements each formed of a plurality of clamp rods of resilient material, and each rod being formed as an open helix having the same pitch and lay, and said rods being assembled into half lay groups, said half lay groups having end portions applied to the main line to form a whole lay and the other end portions applied to the tail end to form a whole lay and having intermediate portions extending between the main line and the tail end in parallel balanced relation.

2. A combination as described in claim 1, wherein the portions of the clamp rods extending between the main line and the tail end are assembled to provide a whole lay.

3. A combination as described in claim 2, wherein the whole lay portion extending between the main line and tail end is provided with a filler.

4. In combination with a main line arranged to be formed into a bight or loop and passed around or through a device to which it is to be anchored and having a tail and brought back into proximity with the main line, means to secure the tail end to the main line and hold it against movement in a longitudinal direction opposite to that of the main line comprising a first element formed of a plurality of clamp rods assembled into a half lay group having the end portions preformed into open helices having an inside diameter less than the outer diameter of the main line and of constant pitch and the same lay and having a center portion formed into a closed lay by twisting the center portion from each end thereof, said first element having one of the half lay ends applied to the main line and the other to the tail end, a second element of a half lay of clamp rods of the same shape as the first element, said second element having the half lay ends applied to the main line and tail end between the first half lay portions of the first element to form whole lay portions around the main line and the tail end.

5. A combination as described in claim 4, wherein the second element has a center portion formed into a twisted closed lay, and the twisted portions extend from the half lay portions on the main line to the half lay portions on the tail end in balanced relation.

6. A combination as described in claim 5, wherein the twisted portions are in spaced parallel relation to each other.

7. In combination with a main line arranged to be formed into a bight or loop and passed around or through a device to which it is to be anchored and having a tail end brought back into proximity with the main line, means to secure the tail end to the main line and held it against movement in a longitudinal direction opposite to that of the main line comprising a first element formed of a plurality of clamp rods assembled into a half lay group having the end portions preformed into open helices having inside diameters less than the outer diameter of the line and of constant pitch and the same lay and having a center portion formed into a closed lay by twisting the center portion from each end thereof, said first element having the one of the half lay ends applied to the main line and the other to the tail end, a second element comprising a plurality of clamp rods of open helix formation in a half lay and constant pitch and diameter throughout their length, said diameter and pitch being the same as the ends of the first element, said second element being applied to the main line intermediate the half lay portions of the first element to form a whole lay and being wrapped around said twisted portion and the other end being applied between the half lay elements of the first element to provide a whole lay at the tail end.

References Cited by the Examiner

UNITED STATES PATENTS 2,959,632 11/60 Peterson _____ 57—145
3,048,003 8/62 Payer _____ 57—144 X MERVIN STEIN, *Primary Examiner.*